United States Patent
White et al.

(10) Patent No.: US 11,257,102 B2
(45) Date of Patent: Feb. 22, 2022

(54) MARKET SEGMENT ANALYSIS OF PRODUCT OR SERVICE OFFERINGS

(71) Applicant: T-Mobile USA, Inc., Bellevue, WA (US)

(72) Inventors: Benjamin White, Plano, TX (US); Suzanne Rocha, Boynton Beach, FL (US); Denise Nicholson-Metz, Decatur, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 893 days.

(21) Appl. No.: 15/593,254

(22) Filed: May 11, 2017

(65) Prior Publication Data
US 2018/0060892 A1 Mar. 1, 2018

Related U.S. Application Data

(60) Provisional application No. 62/382,020, filed on Aug. 31, 2016.

(51) Int. Cl.
*G06Q 30/02* (2012.01)

(52) U.S. Cl.
CPC ..... *G06Q 30/0205* (2013.01); *G06Q 30/0201* (2013.01)

(58) Field of Classification Search
None
See application file for complete search history.

(56) References Cited

U.S. PATENT DOCUMENTS

2005/0251439 A1* 11/2005 Fenich ............... G06Q 30/0204
                                                       705/7.31
2016/0260039 A1* 9/2016 Irving ............... G06Q 10/0637

FOREIGN PATENT DOCUMENTS

WO WO-2016138550 A1 * 9/2016 ......... H04L 43/0852

OTHER PUBLICATIONS

Khaled Kalam, "Market Segmentation, Targeting and Positioning Strategy Adaptation for the Global Business of Vodafone Telecommunication Company," Jul. 2020, International Journal of Research and Innovation in Social Science, vol. IV, Issue VI, pp. 427-430 (Year: 220).*

* cited by examiner

*Primary Examiner* — Amanda Gurski
(74) *Attorney, Agent, or Firm* — Han Santos, PLLC (57) ABSTRACT

This disclosure describes a market segment analysis (MSA) system that facilitates a cluster analysis of market segment data and performance metrics to identify data patterns between individual market segments within a designated market region. Particularly, the MSA system may quantify current performance of existing vendor product or service offerings within a market segment relative to historical performance of the vendor product or service offering within the market segment. Further, the MSA system may quantify current performance of a vendor product or service offering relative to current peer performance of the same or substantially similar vendor product or service offerings within additional market segments. The MSA system may recommend one or more additional market segments for an offering of the vendor product or service. Alternatively, or additionally, the MSA system may recommend one or more vendor product or service offering(s) for a target market segment of a designated market region.

12 Claims, 6 Drawing Sheets

MARKET SEGMENT ANALYSIS OF PRODUCT OR SERVICE OFFERINGS

RELATED APPLICATIONS

This application claims priority to a commonly owned U.S. Provisional Patent Application No. 62/382,020 filed on Aug. 21, 2016, and titled "Segmented Market Offers," which is herein incorporated by reference in its entirety.

BACKGROUND

Vendors of products and services typically rely on key performance indicators to determine the viability of a product or service offering within a marketplace. Key performance indicators may reflect viability of a product or service offering from the perspective of one or more internal business units associated with a vendor. Business units may include an accounting, supply and distribution, operations, sales and marketing, customer care, or a technical service care business unit.

Vendors may also rely on performance indicators to determine whether to offer a product or service to an individual market segment. However, the success of offering a product or service to an individual market segment may depend on a cumulation of performance indicators that reside in different business units of a vendor. Further, merely aggregating performance indicators from across different business units of a vendor may not reveal key data patterns and dependencies that cumulatively influence the success of a product or service offering within a market segment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques that facilitate an analysis of vender product or service offerings within one or more market segment(s) of a designated market region. The techniques may further recommend a vendor product or service offering for a market segment, based on an analysis of the market segment. Alternatively, or additionally, the techniques may recommend additional market segment(s) to offer a vendor product or service, based on an analysis of similar market segments.

Particularly, a market segment analysis (MSA) system may retrieve, from one or more vendor platform(s), market segment data that relates to individual market segments of a designated market region. The designated market region may correspond to a geographic region that comprises of one or more market segment(s). Moreover, the market segment data may be real-time or non-real-time data relating to vendor product or service offerings, vendor client profile data within the market segment, operational data associated with vendor hardware or software infrastructure within the market segment, or any combination thereof. Vendor client profile data may include demographic and affluence data of vendor clients within a market segment. The MSA system may use demographic and affluence data to generate a typical consumer profile of vendor clients within a market segment, of designated market region, generally. A typical client profile may include client gender, race, residential and business geographic location, level of education, employment status, employment place, and preferred social media platforms. Affluence data may further indicate a frequency by which vendor clients transact with the vendor, and a frequency by which vendor clients upgrade, renew, or replace existing vendor and non-vendor products or services with new vendor products or services, and an average expenditure value over a predetermined period of time.

Operational data associated with vendor hardware or software infrastructure may identify a vendor's technology infrastructure and an associated quality of service index. The QoS index may comprise of a normalized numerical value that reflects an incremental grade of quality of service. The QoS index may be based on voice or data transmissions of a telecommunications network of the vendor via the vendor's technology infrastructure, and may consider factors such as packet loss, latency, jitter, echo, downlink throughput, excessive tilt indications, uplink throughput, or a network specific responsiveness of hardware or software infrastructure elements.

In various examples, the MSA system may use market segment data to generate performance metrics associated with each market segment. Performance metrics may include a client adoption rate of a vendor product or service offering, number of clients subscribing to vendor products or services within the market segment, a number of clients transferring to vendor products or services from other vendors, a number of clients transferring away from vendor products or service to other vendors, an average revenue per client, an average revenue for the market segment, a client lifetime value within the market segment, a number of vendor products or services active with the market segment, a record of technical, accounting, or service-related feedback or any combination thereof.

The MSA system may aggregate the market segment data and the performance metrics for each market segment with corresponding historical data stored within the MSA system. Historical data may include historical market segment data and historical performance metrics over a predetermined time interval that preceded the current market segment data and performance metrics. In doing so, the MSA system may establish trend gradients of market segment performance. The MSA system may aggregate data from multiple data sources for a particular time period into an aggregated data file according to one or more grouping parameters. The grouping parameters may include specific time periods (e.g. hourly, daily, etc.), network components, client identifier, client device model, vendor product or service offering, and/or so forth. In other examples, the grouping parameters may be used to aggregate the data into multiple datasets that correspond to a client subscriber level, a device level, a product or service offering level, or a market segment level.

Additionally, the MSA system may perform a cluster analysis of market segment data and performance metrics to identify data patterns between individual market segments. The data patterns may identify similarities relating to vendor product or service offering data, vendor client profile data, vendor technology infrastructure, or performance metrics associated with individual market segments. Further, the cluster analysis may identify data patterns for a particular market segment over different time periods, identify data patterns between different market segments over different time periods, identify data patterns between different market segments over a common time period, or any combination thereof.

Further, the MSA system may use the cluster analysis to recommend one or more additional market segment(s) for a vendor product or service offering. For example, the cluster analysis may identify client profile data patterns between market segment 'A' and market segment 'B'. The MSA system may further determine that product or service offering 'C' had successfully launched within market segment 'A.' In doing so, the MSA system may recommend product or service offering 'C' to market segment 'B.'

Additionally, or alternative, the MSA system may use the cluster analysis to quantify a performance of existing vendor product or service offerings within a market segment. For example, the MSA system may determine how current performance of an existing vendor product or service offering within a market segment compares with historical performance within the same market segment. In some examples, the MSA system may further identify how other market segment data, such as current client profile data and current vendor technology infrastructure, compares with historical market segment data. For example, the MSA system may identify a change in client profile data over time, and as a result, the MSA system may correlate changes in performance of a vendor product or service offering over time, with changes those changes over the same period of time.

Further, the MSA system may use the cluster analysis to quantify a performance of a vendor product or service offering relative to peer performance within other market segments. It is noteworthy that performance may be based on performance metrics associated with the vendor product or service offering. In some examples, the MSA system may compare performance of a vendor product or service offering within a market segment, relative to performance of the same, or substantially similar, vendor product or service offerings within other market segments. The MSA system may use the cluster analysis to identify the other market segments based on similar data patterns relating to client profile data or vendor technology infrastructure. In some examples, the MSA system may perform a peer performance between market segments may be based on a common time period, or different time periods. For example, the MSA system may identify data patterns between current client profile data of market segment 'A' with historical client profile data of market segment 'B', As a result, a peer performance of market segment 'A' relative to market segment 'B' may be based on current performance of market segment 'A' relative to historical performance of market segment 'B'.

In some examples, the MSA system may further generate one or more scores associated with performance of a market segment or performance of a product or service offering within a market segment or designated market region, generally. The one or more score may be based on data patterns defined by the cluster analysis, market segment data, performance metrics, or any combination thereof. The one or more scores may include, a market segment (MS) score of individual market segments, a multi-dimensional market segment (MD-MS) score for individual market segments, or a multi-dimensional performance (MD-P) score for individual vendor product or service offerings within a market segment, or designated market region, generally. The MS score may reflect the viability of product or service offerings within individual market segments. The MS score may comprise of a normalized numerical value that illustrates incremental gradations of the viability of product or service offerings. The MS score may be represented as a single-integer score on a predetermined scale. In a non-limiting example, consider a vendor service offering a telecommunications network service. The MS score for the market segment may be 8 on a predetermined scale of 10. In this example, the MS score may indicate that the viability of the product of service offering within the market segment is afforded an eighty-percent probability of success.

The MD-MS score may combine an indication of market saturation within a market segment with the viability of a product or service offering within a market segment. For example, the MD-MS score may be represented as a two-integer score on a predetermined scale, the first integer reflecting market saturation, and the second integer reflecting the viability of a product or service offering. In a non-limiting example, consider a vendor service offering of a telecommunications network service. The MD-MS score for a market segment may be 0.4-0.9 on a predetermined scale of 1-1. In this example, the MD-MS score may indicate that the market segment is forty percent saturated, and that the viability of the product or service offering is likely ninety-percent. In other words, a forty-percent market segment saturation may indicate that there remains a potential for growth within the market segment, and that a viability of the product or service offering has a ninety-percent probability of success. It is noteworthy that the MSA system may generate an MD-MS score based on any normalized scale that illustrates incremental gradations of market saturation and viability of product or service offerings.

Moreover, the MD-P score may reflect performance of a vendor product or service offering within an individual market segment. The MD-P score may depict current performance relative to historical performance within a market segment. Alternatively, or additionally, the MD-P score may depict current performance relative to the same or substantially similar product or service offerings within additional market segments. The MD-P score may comprise of a normalized numerical value that reflects an incremental grade of performance of a vendor product or service offering. For example, consider a vendor product offering of a telecommunications device with LTE capability. The MSA system may generate an MD-P score of 6-8 on a predetermined scale of 10-10. In this example, the first dimension may reflect current performance of the telecommunications device relative to historical performance within the market segment. The second dimension may reflect current performance of the telecommunications network service relative to current performance of the same or substantially similar product or service offerings within additional marketplace segments. In this example, the first-dimension MD-P score value of 6 may reflect an improvement (i.e. score value of 6 being greater than a mean value of 5 on the predetermined scale of 10) in current performance relative to historical performance within the market segment. Further, the second-dimension MD-P score value of 8 may reflect superior current performance relative to additional market segments.

A technical effect of the MSA system is to improve an efficiency in aggregating market segment data from one or more vendor platform(s) and improving an efficacy and quality of recommendations that pertain to a market segment or a vendor product or service offering. That is, the MSA system may identify data patterns between market segments based on a computational analysis of current and historical data of individual market segments within a designated market region.

Further, the term "techniques," as used herein, may refer to system(s), method(s), computer-readable instruction(s), module(s), algorithms, hardware logic, and/or operation(s) as permitted by the context described above and through the document.

Figure 1:
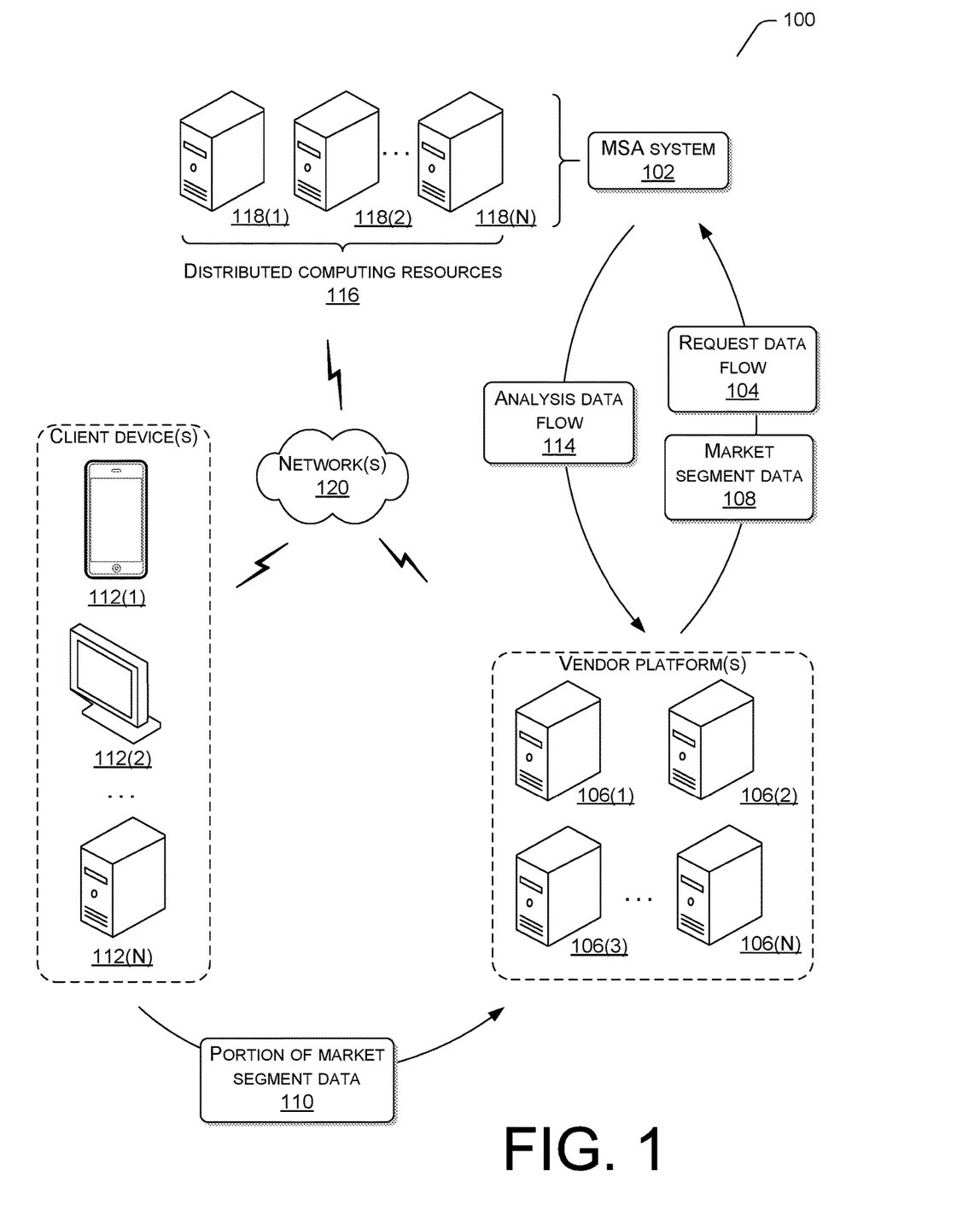
FIG. 1 illustrates a schematic view of a computing environment that facilitates an analysis of one or more market segment(s) of a designated market region, and further recommending a vendor product or service offering based at least in part on the analysis.

FIG. 1 illustrates a schematic view of a computing environment 100 that facilitates an analysis of one or more market segment(s) of a designated market region, and further recommending a vendor product or service offering based at least in part on the analysis. The techniques also facilitate an analysis of the performance of a vendor product or service offering within a market segment, and further recommending additional market segments to offer the vendor product or service, based at least in part on the analysis.

In the illustrated example, the MSA system 102 may receive a request data flow 104 from a vendor platform 106. The vendor platform may correspond to one of an accounting platform, a supply and distributions platform, an operations platform, a sales and marketing platform, a customer care platform, or a technical service care platform. Further, the request data flow 104 may comprise of a recommendation request for one or more market segment(s) to offer a product or service, or a recommendation request for one or more product or service offerings for a target market segment. Alternatively, the request data flow 104 may comprise of a request for a performance analysis of an existing vendor product or service offering within a target market segment.

In the illustrated example, the MSA system 102 may retrieve market segment data 108 from one or more vendor platform(s) 106(1)-106(N). The market segment data 108 may include data relating to vendor product or service offerings, vendor client profile data, operational data of vendor hardware or software infrastructure, or any combination thereof. In some examples, a vendor platform 106 may retrieve a portion of market segment data 110 from one or more client device(s) 112(1)-112(N) that subscribe or interact with the one or more vendor platform(s) 106(1)-106(N).

Moreover, the MSA system 102 may generate performance metrics associated with a market segment, based at least in part on the market segment data. The MSA system 102 may use the performance metrics as an indication of the viability of a vendor product or service offering within a market segment. The performance metrics may include a client adoption rate of a vendor product or service offering, number of clients subscribing to vendor products or services within the market segment, a number of clients transferring to vendor products or services from other vendors, a number of clients transferring away from vendor products or service to other vendors, an average revenue per client, an average revenue for the market segment, a client lifetime value within the market segment, a number of vendor products or services active with the market segment, a record of technical, accounting, or service-related feedback or any combination thereof.

Further, the MSA system 102 analyze the market segment data 108 and associated performance metrics. In doing so, the MSA system 102 may transmit an analysis data flow 114 to one or more vendor platforms 106(1)-106(N). In various examples, the analysis data flow 114 may include a recommendation of one or more market segment(s) for a vendor product or service offering, or a recommendation for one or more vendor product or service offerings for a target market segment. Alternatively, the analysis data flow 114 may include a performance analysis of existing vendor product or service offering within a target market segment. Particularly, the performance analysis may reflect current performance of an existing vendor product or service offering within a target market segment relative to historical performance within the target market segment. Alternatively, or additionally, the performance analysis may reflect current performance relative to current peer performance of the same or substantially similar product or service offerings within other market segments.

In the illustrated example, the MSA system 102 may operate on one or more distributed computing resource(s) 116. The one or more distributed computing resource(s) 116 may include one or more computing device(s) 118(1)-118(N) that operate in a cluster or other configuration to share resources, balance load, increase performance, provide fail-over support or redundancy, or for other purposes. The one or more computing device(s) 118(1)-118(N) may include one or more interface(s) to enable communications with other networked devices, such as one of the client device(s) 112(1)-112(N), via one or more network(s) 120. Further, the one or more network(s) 120 may include public networks such as the Internet, private networks such as an institutional and/or personal intranet, or some combination of private and public networks. The one or more network(s) 120 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Furthermore, the client device(s) 112(1)-112(N) may include any sort of electronic device, such as a cellular phone, a smart phone, a tablet computer, an electronic reader, a media player, a gaming device, a personal computer (PC), a laptop computer, etc. The client device(s) 112(1)-112(N) may have a subscriber identity module (SIM), such as an eSIM, to identify the client device(s) 112(1)-112(N) to a telecommunication service provider network (also preferred to herein as "telecommunication network").

Figure 2:
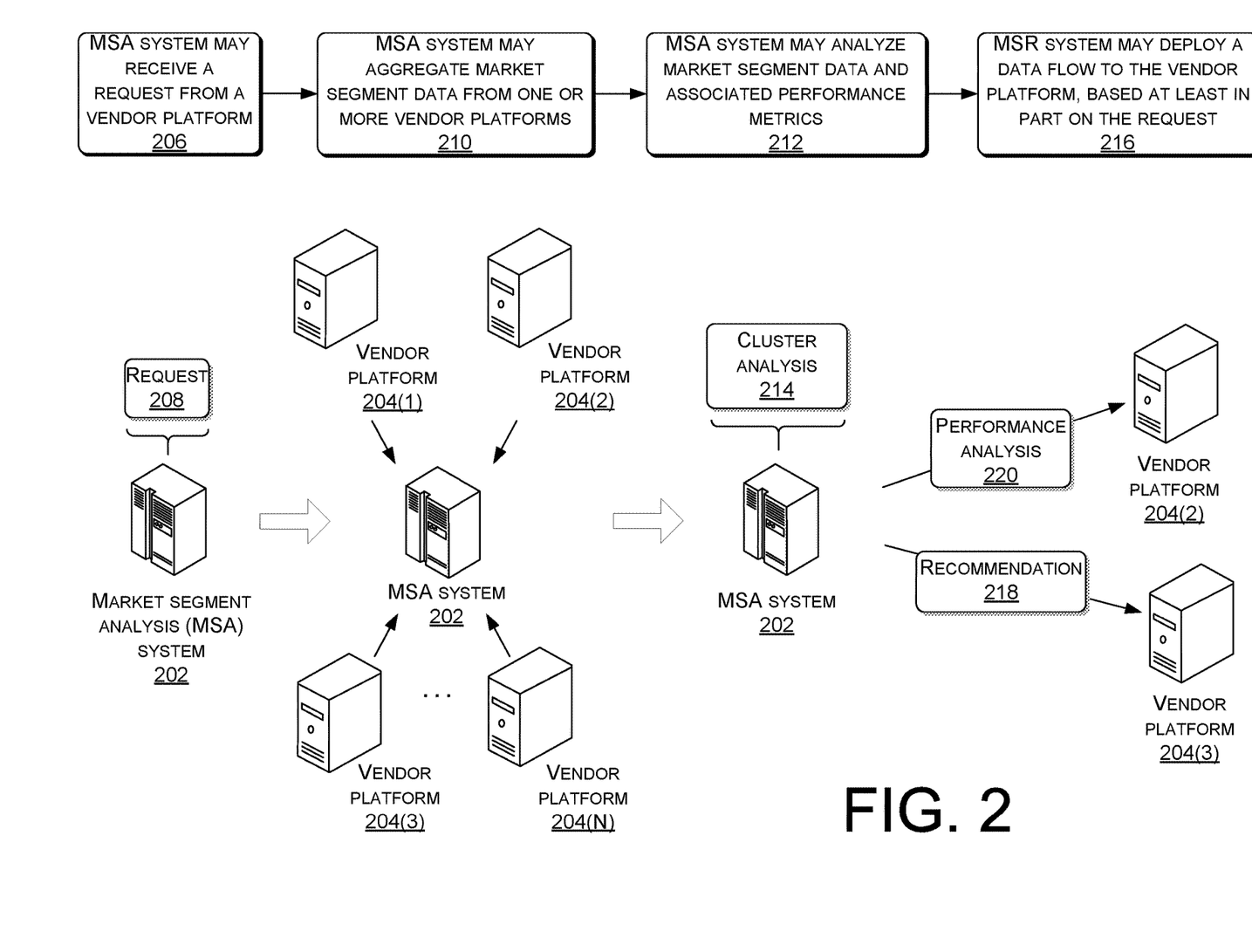
FIG. 2 illustrates a block diagram of an interaction between a Market Segment Analysis (MSA) system and one or more vendor platform(s).

FIG. 2 illustrates a block diagram of an interaction between an MSA system 202 and one or more vendor platform(s) 204(1)-204(N). At block 206, the MSA system 202 may receive a request 208 from a vendor platform. The request 208 may comprise of a recommendation request for one or more market segment(s) to offer a product or service, or a recommendation request for one or more product or service offerings for a target market segment. Alternatively, the request 208 may comprise of a request for a performance analysis of an existing vendor product or service offering within a target market segment.

At block 210, the MSA system 202 may aggregate market segment data from one or more vendor platform(s) 204(1)-204(N). The market segment data may include data relating to vendor product or service offerings, vendor client profile data, operational data of vendor hardware or software infrastructure, or any combination thereof. Further, the one or more vendor platform(s) 204(1)-204(N) may correspond to one of an accounting platform, a supply and distributions platform, an operations platform, a sales and marketing platform, a customer care platform, or a technical service care platform.

At block 212, the MSA system 202 may analyze market segment data and associated performance metrics. In some examples, the MSA system 202 may use the cluster analysis 214 of market segment data to recommend one or more additional market segment(s) for the vendor product or service offering. Alternatively, or additionally, the MSA system 202 may use the cluster analysis 214 to quantify performance of existing vendor product or service offerings within a market segment. For example, the MSA system 202 may quantify current performance of a vendor product or service offering within a market segment relative to historical performance of the vendor product or service offering within the market segment. Additionally, or alternatively, the MSA system 202 may quantify current performance of a vendor product or service offering within a market segment relative to current peer performance of the same or substantially similar vendor product or service offerings within additional market segments.

At block 216, the MSA system 202 may deploy a data flow to the vendor platform, based at least in part on the request 208. The data flow may comprise of a recommendation 218 or a performance analysis 220. The recommendation 218 may comprise of one or more additional market segment(s) for a vendor product or service offering, or one or more vendor product or service offering(s) for a target market segment.

Further, the performance analysis 220 may quantify performance of existing vendor product or service offerings within a target market segment. That is, the performance analysis 220 may quantify current performance of existing vendor product or service offerings within a market segment relative to historical performance of the vendor product or service offering within the market segment. Additionally, or alternatively, the performance analysis 220 may quantify current performance of a vendor product or service offering within a market segment relative to current peer performance of the same or substantially similar vendor product or service offerings within additional market segments.

Figure 3:
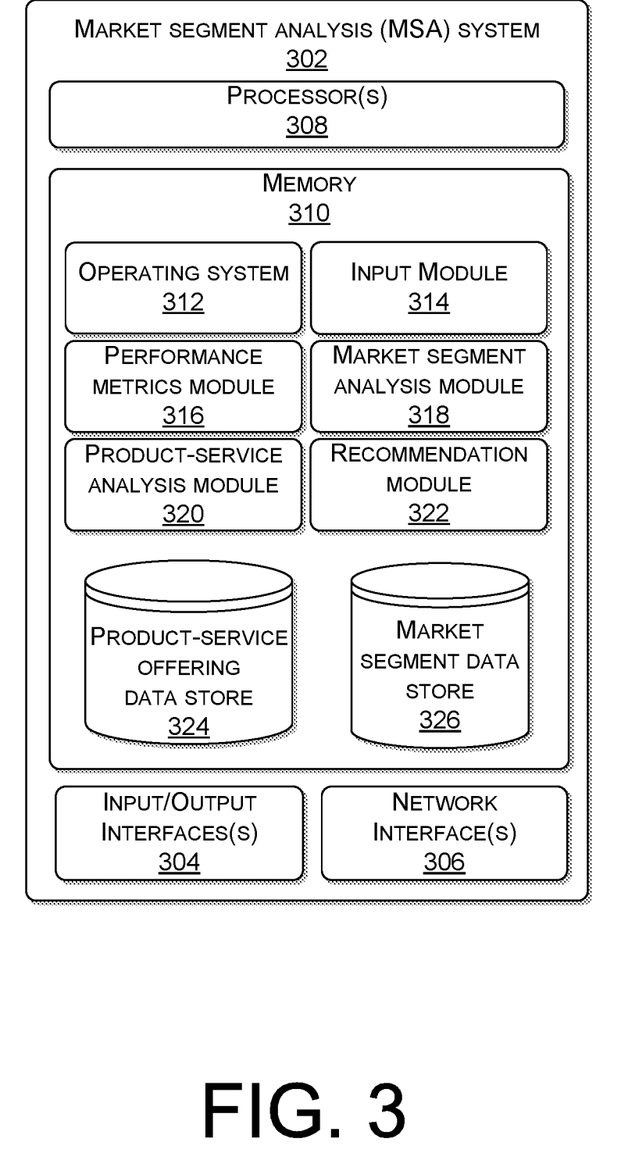
FIG. 3 illustrates a block diagram of an MSA system that may generate a performance analysis of a vendor product or service offering within a market segment, a recommendation of a market segment for a vendor product or service offering, or a recommendation of a vendor product or service offering for a market segment.

FIG. 3 illustrates a block diagram of an MSA system that may generate a performance analysis of a vendor product or service offering within a market segment, a recommendation of a market segment for a vendor product or service offering, or a recommendation of a vendor product or service offering for a market segment.

In the illustrated example, the MSA system 302 may correspond to the MSA system 102 and 202. The MSA system 302 may include routines, program instructions, objects, and/or data structures that perform particular tasks or implement particular abstract data types. Further the MSA system 302 may include input/output interface(s) 304. The input/output interface(s) 304 may include any type of output interface known in the art, such as a display (e.g. a liquid crystal display), speakers, a vibrating mechanism, or a tactile feedback mechanism. Input/output interface(s) 304 also include ports for one or more peripheral device(s), such as headphones, peripheral speakers, or a peripheral display.

Further, the input/output interface(s) 304 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the MSA system 302 may include network interface(s) 306. The network interface(s) 306 may include any sort of transceiver known in the art. For example, the network interface(s) 306 may include a radio transceiver that performs the function of transmitting and receiving radio frequency communications via an antenna. In addition, the network interface(s) 306 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 306 may include wired communication components, such as an Ethernet port or a Universal Serial Bus (USB).

Further, the MSA system 302 may include one or more processor(s) 308 that are operably connected to memory 310. In at least one example, the one or more processor(s) 308 may be a central processing unit(s) (CPU), graphics processing unit(s) (GPU), a both a CPU and GPU, or any other sort of processing unit(s). Each of the one or more processor(s) 308 may have numerous arithmetic logic units (ALUs) that perform arithmetic and logical operations as well as one or more control unit(s) (CUs) that extract instructions and stored content from processor cache memory, and then executes these instructions by calling on the ALUs, as necessary during program execution. The one or more processor(s) 308 may also be responsible for executing all computer applications stored in the memory, which can be associated with common types of volatile (RAM) and/or nonvolatile (ROM) memory.

In some examples, memory 310 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, input module 314, a performance metrics module 316, market segment analysis module 318, product-service analysis module 320, recommendation module 322, product-service offering data store 324, and a market segment data store 326. The operating system 312 may be used to implement the input module 314, a performance metrics module 316, market segment analysis module 318, product-service analysis module 320, recommendation module 322, product-service offering data store 324, and a market segment data store 326. The operating system 312 may be any operating system capable of managing computer hardware and software resources.

The input module 314 may receive a vendor platform, a recommendation request for one or more market segment(s) to offer a product or services. The input module 314 may further receive, from a vendor platform, a recommendation request for a product or service to offer within a target market segment of a designated market region. Alternatively, or additionally, the input module 314 may receive, from a vendor platform, a request for a performance analysis of existing vendor product or service offerings within a market segment. In various examples, the vendor platform may include one or more vendor platform(s) may include an accounting platform, a supply and distributions platform, an operations platform, a sales and marketing platform, a customer care platform, or a technical service care platform.

In various examples, the input module 314 may further receive market segment data from one or more market segment(s) within a designated market region. The market segment data may include, but is not limited to, data relating to vendor product or service offerings, vendor client profile data, operational data associated with vendor hardware or software infrastructure, or any combination thereof. The input module 314 may retrieve market segment data in response to receipt of a market segment recommendation to offer a product or service, a product or service recommendation to offer to a target market segment, or a performance analysis request for existing vendor product or service offerings within a market segment.

The performance metrics module 316 may generate performance metrics associated with a target market segment, based at least in the part on the market segment data. The performance metrics may indicate the viability of a vendor product or service offering within a market segment. In various examples, the performance metrics may include a client adoption rate of a vendor product or service offering, number of clients subscribing to vendor products or services within the market segment, a number of clients transferring to vendor products or services from other vendors, a number of clients transferring away from vendor products or service to other vendors, an average revenue per client, an average revenue for the market segment, a client lifetime value within the market segment, a number of vendor products or services active with the market segment, a record of technical, accounting, or service-related feedback or any combination thereof.

Additionally, the performance metrics module 316 may normalize performance metrics associated with a market segment based on historical performance within the market segment, or relative peer performance of the same or substantially similar vendor product or service offerings within additional market segments. In doing so, the normalized performance metrics may reflect a rate of change in current performance of each existing vendor product or service offering.

Further, the performance metrics may include an integration index, an interaction index. The integration and interaction indicia may reflect a respective integration and interaction of a vendor product or service with existing technology and infrastructure of a market segment. The integration index may measure the efficacy of a vendor product or service integrating with existing vendor hardware or software infrastructure of a market segment. Further, the interaction index may measure the efficacy of a vendor product or service interacting with existing vendor hardware or software infrastructure of the market segment.

The integration index and the interaction index may comprise of normalized numerical values that reflect an incremental grade of client device integration and interaction with vendor infrastructure, respectively. In some examples, an increase in value of an integration index or interaction index may reflect an improving standard of integration and interaction, respectively.

In a non-limiting example, consider a vendor service offering of a telecommunications network service. The integration index may reflect the efficacy of integrating a client device with the telecommunications network. The integration index may be based at least in part on threshold criteria, client feedback, integration processing time, and a quantitative measure of the technical complexity of the integration. In a non-limiting example, a vendor may intend to offer a telecommunications device with a Long-Term Evolution (LTE) network capability. In this example, LTE network capability may be a threshold criteria for offering the telecommunications device. Thus, the integration index below a mean-value may reflect difficulties in integrating a telecommunications device with LTE capability into a dated network infrastructure that does not support an LTE network.

Further, the interaction index may reflect an efficacy of the client device interacting with the telecommunications network. The interaction index may be based on a probability that network infrastructure can support a full-feature operation of the client device on the telecommunications network. For example, consider a client device capable of operating on an LTE network. A market segment that does not support an LTE network may receive a low interaction index relative to another market segment that has adopted LTE infrastructure.

The market segment analysis module 318 may analyze market segment data associated with one or more market segment(s) of a designated market region. The designated market region may correspond to a geographic region that comprises of one or more market segment(s).

Particularly, the market segment analysis module 318 may perform a cluster analysis of market segment data to identify data patterns between one or more market segment(s) of the designated market region. In some examples, the cluster analysis may be used to determine performance of existing vendor product or service offerings within a market segment. In other examples, the cluster analysis may be used to prospectively recommend one or more product or service offering(s) to a target market segment.

Market segment data may include data relating to vendor product or service offerings, vendor client profile data, operational data associated with vendor hardware or software infrastructure, or any combination thereof. In a non-limiting example, market segment data of vendor product or service offerings may relate to market penetration of vendor products or services, vendor products or services currently active with the market segment, a rate of clients transferring to vendor products or services from other vendors, and a rate of clients transferring away from vendor products or services to other vendors.

Moreover, market segment data that includes vendor client profile data may include demographic and affluence data of vendor clients within a market segment. The MSA system may use demographic and affluence data to generate a typical consumer profile of vendor clients within a market segment, or designated market region, generally. A typical client profile may include client gender, race, residential and business geographic location, level of education, employment status, employment place, and preferred social media platforms. Affluence data may further indicate a frequency by which vendor clients transact with the vendor, and a frequency by which vendor clients upgrade, renew, or replace existing vendor and non-vendor products or services with new vendor products or services, and an average expenditure value over a predetermined period of time.

Additionally, market segment data that includes vendor hardware or software infrastructure may identify a vendor's technology infrastructure and an associated quality of service (QoS) index. The QoS index may comprise of normalized numerical value that reflects an incremental grade of quality of service. For example, consider market segment data, which indicates that a vendor is operating a Long-Term Evolution (LTE) network. In this instance, a QoS index of the LTE network may be based on service data associated with the LTE network, such as network latency, packet loss, jitter, echo, downlink throughput, excessive tilt indications, uplink throughput, or a network-specific responsiveness of hardware or software infrastructure elements.

Further, the market segment analysis module 318 may identify additional market segments that are substantially similar to a target market segment based on data patterns between product and service offerings within the target market segment and the additional market segments. In doing so, the cluster analysis may determine a likelihood that a product or service offering may prosper in a target market segment. For example, the market segment analysis module 318 may identify data patterns that indicate a first and second market segment have clients with substantially similar vendor client demographic data. In doing so, the market segment analysis module 318 may recommend that a product or service offering in the first market segment may prosper in the second market segment, based at least in part on the vendor client demographic data similarity. In various examples, similarities between market segments may be based at least in part on market saturation, vendor client affluence data, reliability and capability of vendor hardware or software infrastructure, or any combination thereof.

Moreover, the market segment analysis module 318 may generate a market segment (MS) score or a multi-dimensional market segment (MD-MS) score based at least in part on the cluster analysis. The MS score and the MD-MS score may reflect market segment correlations and dependencies between any combination data-points such as, market penetration of a vendor product or service offering, demographic and affluence data of vendor clients, and a reliability and capability of vendor hardware or software infrastructure.

In some examples, the multi-dimensionality of the MD-MS score may combine an indication of market saturation within a market segment, and a viability of a product or service offering within a market segment. For example, the MD-MS score may be represented as a two-integer score on a predetermined scale, the first integer reflecting market saturation, and the second integer reflecting the viability of a product or service offering. Alternatively, the MS score may indicate one of market saturation within a market segment, or a viability of a product or service offering within a market segment.

In a non-limiting example, consider a vendor service offering of a telecommunications network service. The MD-MS score for a market segment may be 9-5 on a predetermined scale of 10-10. In this example, the MD-MS score may indicate that the market segment is ninety percent saturated, and that the viability of the product or service offering is likely fifty-percent. It is noteworthy that the MSA system may generate an MD-MS score based on any normalized scale that illustrates incremental gradations of market saturation, viability of product or service offerings, or a combination of both.

Market saturation may describe a likelihood of a market segment gathering a predetermined level of additional client interest for a vendor product or service offering. Market saturation may be based on a population index of existing products or services within a market segment that are analogous to the vendor product or service, a proportion of active vendor clients within a market segment relative to a total population of the market segment, or a combination of both. Additionally, or alternatively, market saturation may be based on a client adoption rate of vendor products or services. In this example, market saturation may be reflective of a rate of client adoption has room to grow, plateaued, or declined.

Further, the viability of a product or service offering may be based on market segment data, such as demographic and affluence data of vendor clients, vendor hardware or software infrastructure, or any combination thereof. In some examples, the viability of a product or service offering, as reflected within the MD-MS score, may be weighted based on satisfying threshold criteria associated with a product or service offering. For example, a vendor may intend to offer a telecommunications device with LTE network capability. In doing so, the MSA system may generate an MD-MS score with a higher weighted-component score for viability of a product or service offering, based on the availability of LTE infrastructure within a market segment, relative to a market segment without LTE infrastructure.

The product-service analysis module 320 may analyze product or service offerings within one or more market segment(s) of a designated market region. Further, the product-service analysis module 320 may determine threshold criteria that are associated with an offering of a product or service within a market segment. In a non-limiting example, a vendor may intend to offer a telecommunications device with a Long-Term Evolution (LTE) network capability. In this example, a threshold criteria may correspond to a Long-Term Evolution (LTE) network threshold criteria. Further, an offering of a software upgrade to improve vendor service performance may be associated with a device type threshold criteria.

Additionally, the product-service analysis module 320 may generate a multi-dimensional performance (MD-P) score for individual vendor product or service offerings within a market segment. The MD-P score may depict current performance relative to historical performance of the existing vendor product or service offerings within the target market segment. Additionally, or alternatively, the MD-P score may depict current performance relative to performance of the same or substantially similar product or service offerings within additional market segments. The MD-P score may comprise of a normalized numerical value that reflects an incremental grade of performance of a vendor product or service offering.

In various examples, the product-service analysis module 320 may generate the MD-P score based on market segment data and performance metrics associated with the market segment. In some examples, the performance metrics may relate to the vendor product or service offering within the market segment. The market segment data may include data relating to vendor product or service offerings, client profile data of vendor clients, operational data associated with vendor hardware or software infrastructure, or any combination thereof. Further, the performance metrics may include a number of clients subscribing to the vendor product or service offering within a market segment, a number of clients transferring to the vendor product or service offering from substantially similar product or service offerings of other vendors, a number of clients transferring away from the vendor product or service to a substantially similar product or service offering of other vendors, an average revenue per client, an average revenue for the market segment, a client lifetime value within the market segment, a number of vendor products or services active with the market segment, or any combination thereof.

For example, consider a vendor service offering a telecommunications network service within the market segment. The MSA system may generate an MD-P score of 4-8 for the market segment, based on a predetermined scale of 10-10. In this example, the first dimension may reflect current performance of the telecommunications network service relative to historical performance within the market segment. The second dimension may reflect current performance of the telecommunications network service relative to current performance of the same or substantially similar product or service offerings within additional marketplace segments. In this example, the first-dimension MD-P score value of 4 may reflect a decline (i.e. score value of 4 being less than a mean value of 5 on the predetermined scale of 10) in current performance relative to historical performance within the market segment. Further, the second-dimension MD-P score value of 8 may reflect superior current performance relative to additional market segments.

In some examples, the product-service analysis module 320 may normalize the market segment data and performance metrics based at least in part on the number of clients within a market segment, the number of non-subscriber consumers within the market segment, or a combination of both. Normalization of the market segment data and performance metrics may negate the influence of population size within a market segment. For example, the MSA system may receive favorable product and service data from a market segment of a designated market region with a subscriber population that is relatively smaller than a market segment exhibiting unfavorable product and service data. In this instance, the influence of the market segment with relatively fewer subscribers may be negated by unfavorable product and service data of the market segment with a larger subscriber base. Thus, normalizing the product and service data may help bring to the fore, the influence of the market segment with fewer subscribers.

The recommendation module 322 may generate a recommendation for one or more vendor product or service offering(s) for a target market segment based at least in part in part on an MS score or MD-MS score. In various examples, the recommendation module 322 may rank the one or more vendor product or service offering(s) based on respective MS or MD-MS scores.

The product-service offering data store 324 may include a record of current and historical product-service offering data along with associated performance metrics. In various examples, the product-service data store may include a client adoption rate of a vendor product or service offering, number of clients subscribing to vendor products or services within the market segment, a number of clients transferring to vendor products or services from other vendors, a number of clients transferring away from vendor products or service to other vendors, an average revenue per client, an average revenue for the market segment, a client lifetime value within the market segment, a number of vendor products or services active with the market segment, a record of technical, accounting, or service-related feedback or any combination thereof.

The market segment data store 326 may include a record of current and historical market segment data associated within one or more market segment(s) within a designated market region. Market segment data may include data relating to vendor product or service offerings, vendor client profile data, operational data associated with vendor hardware or software infrastructure, and any combination thereof.

Figure 4:
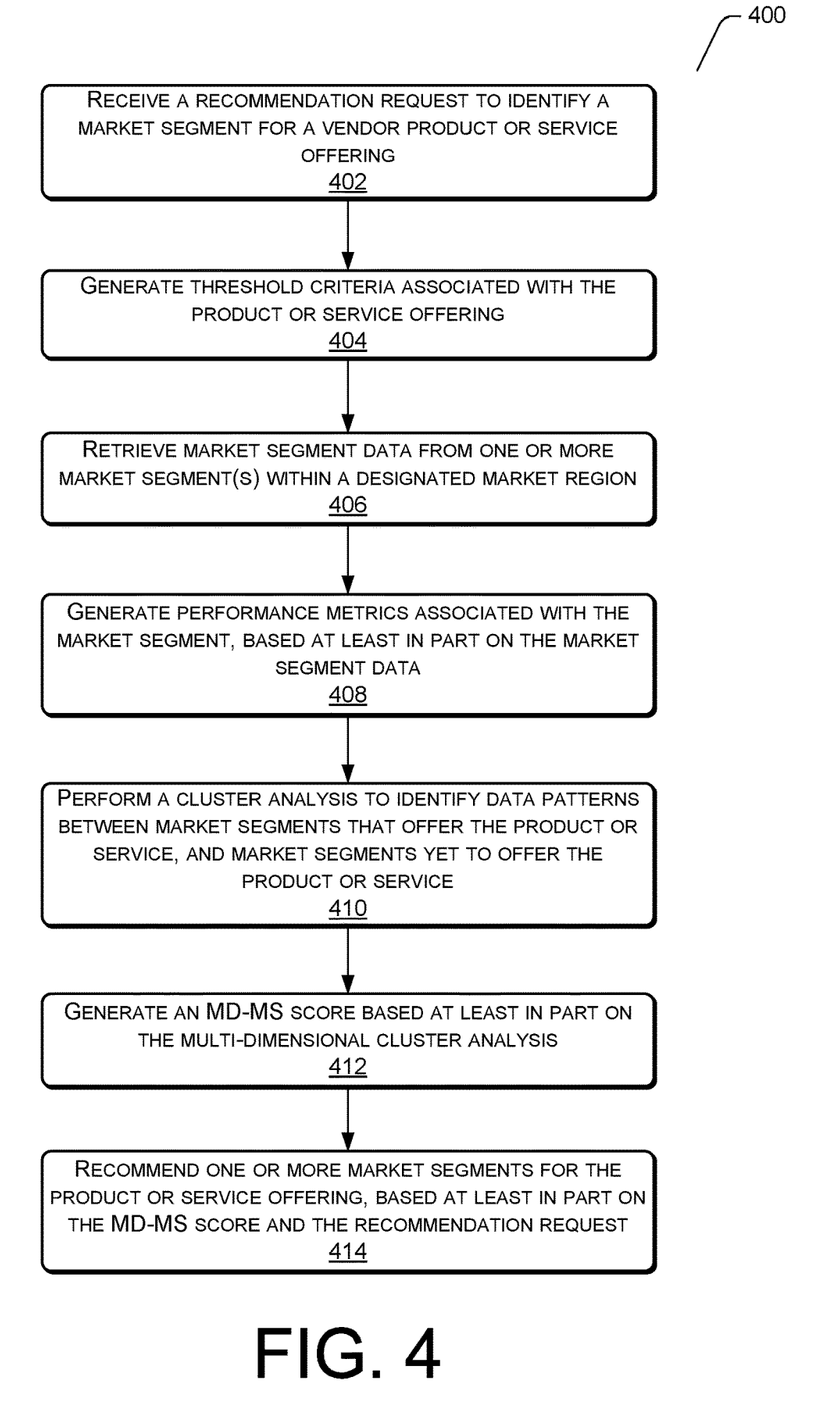
FIG. 4 illustrates an MSA system process for generating a recommendation for one or market segments to offer a product or service.
Figure 5:
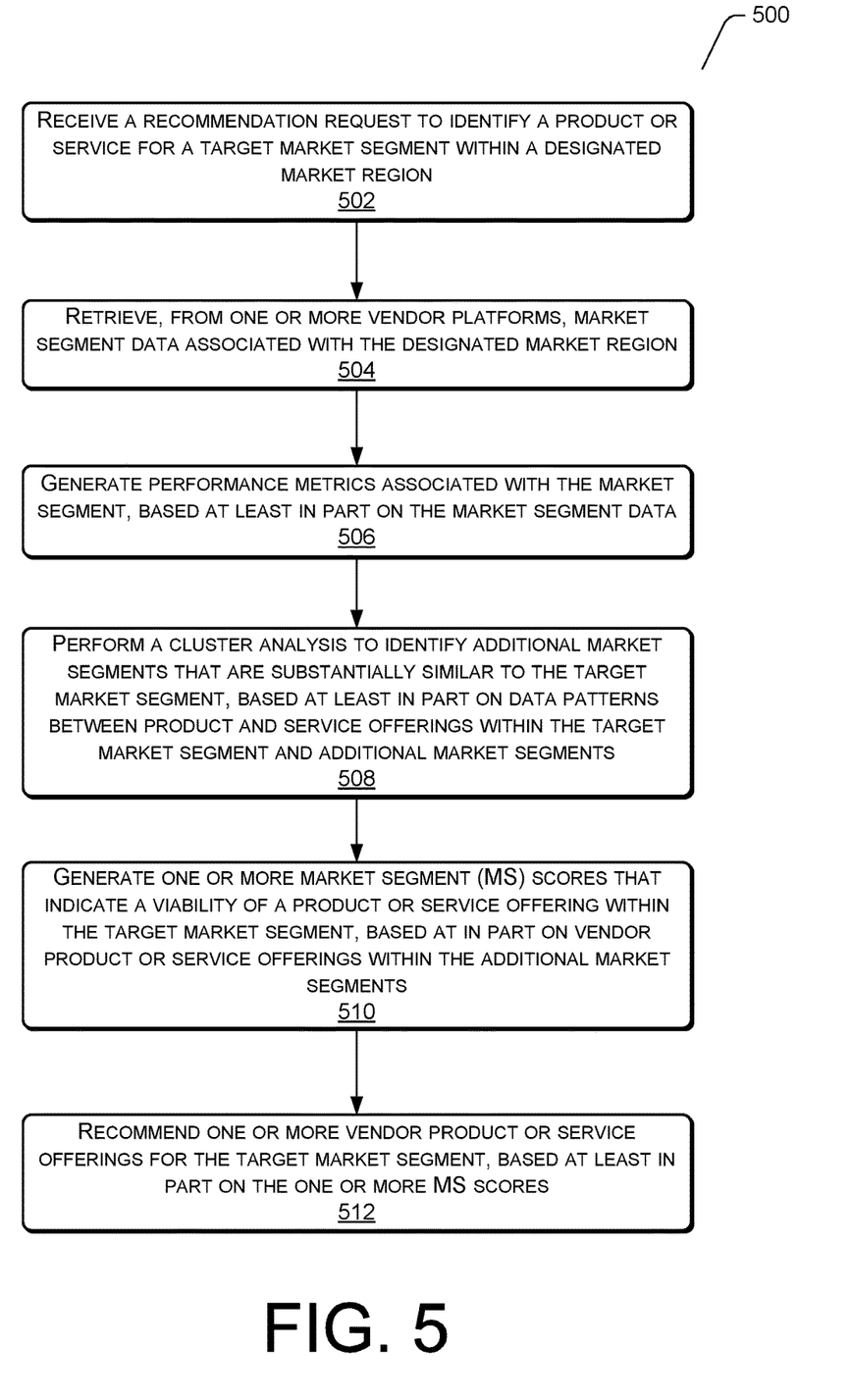
FIG. 5 illustrates an MSA system process for generating a recommendation of one or more vendor product(s) or service(s) to offer within a target market segment.

FIGS. 4, and 5 present processes 400 and 500 that relate to operations of the market segment analysis (MSA) system. Each of processes 400 and 500 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the escribed blocks can be combined in any order and/or in parallel to implement the process. For discussion purposes, the processes 400 and 500 are described with reference to the computing environment 100 of FIG. 1.

FIG. 4 illustrates an MSA system process for generating a recommendation for one or market segments to offer a product or service. In various examples, the MSA system may perform a cluster analysis to identify data patterns between market segments that offer the product or service, and market segments that are yet to offer the product or service. The MSA system may generate an MD-MS score based on the cluster analysis. The MD-MS score may reflect market saturation, a viability of a product or service offering, or a combination of both. Further, the MSA system may recommend one or more market segment(s) for offerings of the product or service, based at least in part on the MD-MS score and the recommendation request.

At 402, the MSA system may receive, from a vendor platform, a recommendation request to identify a market segment for a vendor product or service offering. The market segment may comprise of a geographic portion of a designated market region that is serviced by the vendor. Additionally, the vendor product or service offering may relate to a tangible product offered by the vendor such as telecommunication device, or a service offered by the vendor such as a communications network service accessible by a telecommunications device. In other examples, the vendor product or service offering may relate to an ancillary product or service that is intended to complement, support, improve performance, or constitute an upgrade of a product or service. An ancillary product may correspond to a software or hardware component upgrade of a telecommunications device. Further, an ancillary service may relate to providing a consumer with access, or improved access, to a telecommunications data network. The ancillary service may also add new functionality to data transmission over one or more network(s).

At 404, the MSA system may generate threshold criteria associated with a product or service offering. The threshold criteria may identify requisite hardware or software infrastructure. In a non-limiting example, an offering of a telecommunications device may be associated with a Long- Term Evolution (LTE) network threshold criteria. Further, an offering of a software upgrade to improve vendor service performance may be associated with a device type threshold criteria.

At 406, the MSA system may retrieve, from one or more vendor platform(s), market segment data from one or more market segment(s) within a designated market region. The designated market region may correspond to a geographic region that comprises of one or more market segment(s). A vendor platform may include one of an accounting platform, a supply and distributions platform, an operations platform, a sales and marketing platform, a customer care platform, or a technical service care platform.

The market segment data may be associated with individual market segments of a designated market region. The market segment data may include data relating to vendor product or service offerings, vendor client profile data, operational data associated with vendor hardware or software infrastructure, or any combination thereof.

At 408, the MSA system may generate performance metrics associated with the market segment, based at least in part on the market segment data. In some examples, the MSA system may use performance metrics to help determine the viability of offering a product or service by measuring the efficacy of a vendor product or service offering within one or more market segment(s) of the designated market region. Particularly, performance metrics may include as client adoption rate, an integration index, an interaction index, a record of technical, accounting, or service-related feedback, or any combination thereof.

Additionally, the MSA system may normalize the market segment data based at least in part on the number of subscriber consumers within a market segment, the number of non-subscriber consumers within the market segment, or a combination of both.

At 410, the MSA system may perform a cluster analysis to identify data patterns between market segments that offer the product or service, and market segments that are yet to offer the product or service. Particularly, the cluster analysis may analyze, correlate and combine market segment data and associated performance metrics that relate to the recommendation request.

Further, the MSA system may analysis performance metrics for each market segment that relates specifically to the product or service. The purpose of doing so is to determine the viability of the product or service offering within each market segment. In doing so, the MSA system may determine whether performance of the product or service is greater than a predetermined performance threshold, based at least in part on the market segment data, and ensuing performance metrics. The MSA system may selectively omit market segments that exhibit a performance of the product or service that is less than the predetermined performance threshold. Further, the predetermined performance threshold may be established by operators of the MSA system.

At 412, the MSA system may generate an MD-MS score based at least in part on the cluster analysis. The MD-MS score may reflect market segment correlations and dependencies between any combination data-points such as, market penetration of a vendor product or service offering, demographic and affluence data of vendor clients, and a reliability and capability of vendor hardware or software infrastructure.

In some examples, the multi-dimensionality of the MD-MS score may indicate a level of market saturation within a market segment, a viability of a product or service offering within a market segment, or a combination of both. For example, the MD-MS score may be represented as a two-integer score on a predetermined scale, the first integer reflecting market saturation, and the second integer reflecting the viability of a product or service offering.

Further, the viability of a product or service offering may be based on market segment data, such as demographic and affluence data of vendor clients, vendor hardware or software infrastructure, or any combination thereof. In some examples, the viability of a product or service offering may be weighted based on satisfying threshold criteria associated with a product or service offering. For example, a vendor may intend to offer a telecommunications device with LTE network capability. In doing so, the MSA system may generate an MD-MS score with a higher weighted-component score for viability of a product or service offering, based on the availability of LTE infrastructure within a market segment, relative to a market segment without LTE infrastructure.

At 414, the MSA system may recommend one or more market segment(s) for the product or service offering, based at least in part on the MD-MS score and the recommendation request. In various examples, the MSA system may rank the one or more market segment(s) based on MD-MS component scores for market saturation and viability of a product or service offering. In other examples, one or more market segment(s) may be ranked based on the overall combination of components within the MD-MS score.

FIG. 5 illustrates an MSA system process for generating a recommendation of one or more vendor products or services to offer within a target market segment. In various examples, the MSA system may perform a cluster analysis of market segment data and associated performance metrics. In doing so, the MSA system may identify data patterns between the target market segment and additional market segments within a designated market region, and further recommend one or more product or service offerings within the target market segment.

At 502, the MSA system may receive, from a vendor platform, a recommendation request to identify a product or service for a target market segment within a designated market region. In some examples, the product or service may relate to a tangible good offered by the vendor, such as a telecommunication device, or a service offered by the vendor, such as a communications network service accessible by a telecommunications device.

At 504, the MSA system may retrieve, from one or more vendor platform(s), market segment data associated with the target market segment. The market segment data may include data relating to vendor product or service offerings, client profile data of vendor clients, operational data associated with vendor hardware or software infrastructure, or any combination thereof. Further, the one or more vendor platform(s) may include an accounting platform, a supply and distributions platform, an operations platform, a sales and marketing platform, a customer care platform, or a technical service care platform. The market segment data may further include a QoS index that is associated with vendor hardware or software infrastructure of the target market segment. For example, consider market segment data, which indicates that a vendor is operating a Long-Term Evolution (LTE) network. In this instance, a QoS index of the LTE network may be based on service data associated with the LTE network, such as network latency, jitter, echo, packet loss, downlink throughput, excessive tilt indications, uplink throughput, or a network-specific responsiveness of hardware and software elements.

At 506, the MSA system may generate performance metrics associated with the market segment, based at least in part on the market segment data. In some examples, the MSA system may normalize the market segment data associated with the target market segment, based at least in part the number of subscriber consumers within a market segment, the number of non-subscriber consumers within the market segment, or a combination of both.

Further, the performance metrics may include existing vendor product and service offerings, client adoption rate of existing vendor products or services, an integration index, an interaction index, a record of technical, accounting, or service-related feedback, or any combination thereof. The integration index may reflect the efficacy of integrating an existing vendor product or service within the target market segment. The integration index may be based at least in part on client feedback, integration processing time, and a quantitative measure of the technical complexity of integration. The interaction index may reflect an efficacy of a vendor product or service interacting with existing hardware or software infrastructure within the target market segment.

At 508, the MSA system may perform a cluster analysis of market segment data that relates to the target market segment and additional market segments within the designated market region. The MSA system may identify additional market segments that are substantially similar to the target market segment based on data patterns between product and service offerings within the target market segment and the additional market segments.

Particularly, the cluster analysis may analyze, correlate and combine market segment data and associated performance metrics that relate to the target market segment and additional market segments. In various examples, similarities between the target market and additional market segments may be further based at least in part on market saturation, vendor client demographic and affluence data, vendor hardware or software infrastructure, and any combination thereof.

At 510, the MSA system may generate one or more MS-scores that indicate a viability of product or service offerings within the target market segment, based at least in part on vendor product or service offerings within the additional market segments. Particularly, the MSA system may generate individual MS scores for the viability of individual product or service offerings within the target market segment. Each MS score may be based at least in part on a client adoption rate of existing vendor products or services within the additional market segments, and a record of technical, accounting, or service-related feedback, or any combination thereof.

At 512, the MSA system may recommend one or more vendor product or service offering(s) for the target market segment, based at least in part on one or more MS scores. In various examples, the MSA system may rank the one or more product or service offerings based on the MS scores.

Figure 6:
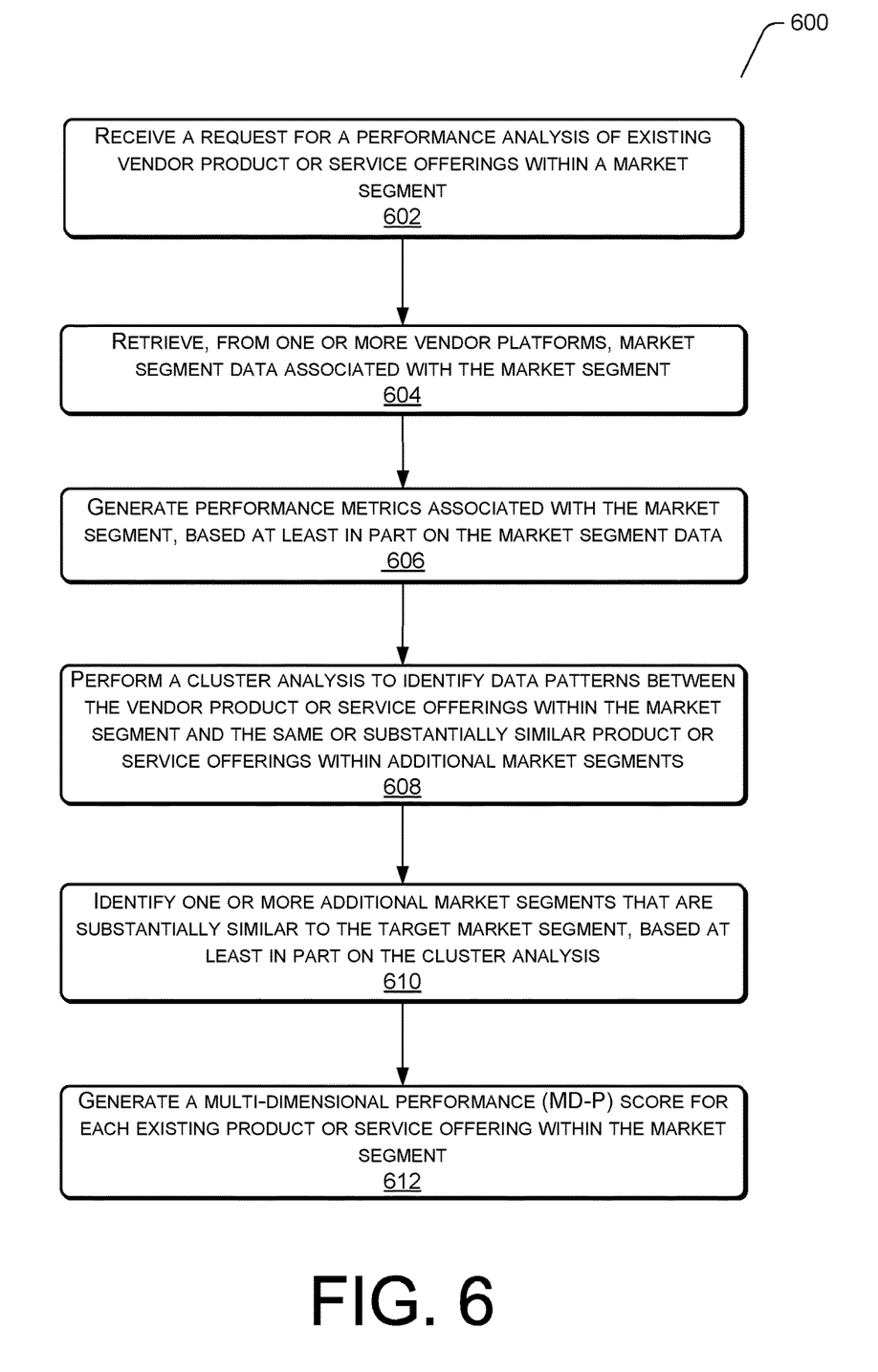
FIG. 6 illustrates an MSA system process for analyzing current performance of one or more existing vendor product or service offering(s) within a market segment.

FIG. 6 illustrates an MSA system process for analyzing current performance of one or more existing vendor product or service offerings within a target market segment. In some examples, the performance analysis may generate a multi-dimensional performance (MD-P) score for individual vendor product or service offerings within the target market segment. The MD-P score may depict current performance relative to historical performance of the existing vendor product or service offerings within the market segment. Additionally, or alternatively, the MD-P score may depict current performance relative to the same or substantially similar product or service offerings within additional market segments.

At 602, the MSA system may receive a request for a performance analysis of existing vendor product or service offerings within a target market segment. In various examples, the existing product or service offerings may relate to tangible products offered by the vendor such as a telecommunication device, or a service offered by the vendor such as a communications network service accessible by a telecommunications device. In other examples, the vendor product or service offerings may complement, support, improve performance, or constitute an upgrade of an existing vendor product or service.

At 604, the MSA system may retrieve, from one or more vendor platform(s), market segment data associated with the target market segment. The market segment data may include data relating to vendor product or service offerings, client profile data of vendor clients, operational data associated with vendor hardware or software infrastructure, or any combination thereof. Further, the one or more vendor platform(s) may include an accounting platform, a supply and distributions platform, an operations platform, a sales and marketing platform, a customer care platform, or a technical service care platform.

At 606, the MSA system may generate performance metrics associated with the target market segment, based at least in part on the market segment data. The performance metrics may include a number of clients subscribing to the vendor product or service offering within a market segment, a number of clients transferring to the vendor product or service offering from substantially similar product or service offerings of other vendors, a number of clients transferring away from the vendor product or service to a substantially similar product or service offering of other vendors, an average revenue per client, an average revenue for the market segment, a client lifetime value within the market segment, a number of vendor products or services active with the market segment, or any combination thereof.

Moreover, the MSA system may normalize the market segment data of the target market segment, based at least in part on the number of clients within a market segment, the number of non-subscriber consumers within the market segment, or a combination of both.

At 608, the MSA system may perform a cluster analysis to identify data patterns between the target market segment and additional market segments that offer the same or substantially similar product or service offerings. Particularly, the cluster analysis may analyze, correlate, and combine market segment data and associated performance metrics that relate to the target market segment and the additional market segment.

At 610, the MSA system may identify one or more additional market segments that are substantially similar to the target market segment, based at least in part on the cluster analysis. In various examples, similarities between the target market and additional market segments may be based at least in part on market saturation, demographic and affluence data of vendor clients, vendor hardware or software infrastructure, or any combination thereof. Further, the MSA system may generate a similarity index to quantify a similarity of the one or more additional market segments and the target market segment. In doing so, the MSA system may determine that the one or more additional market segments are substantially similar to the target market segment based at least in part on the similarity index being greater than a predetermined similarity threshold. The predetermined similarity threshold may be established by operators of the MSA system.

At 612, the MSA system may generate a multi-dimensional performance (MD-P) score for each existing vendor product or service offering within the market segment. Particularly, the MD-P score may comprise of one or two dimensions (i.e. normalized numerical values) that reflect current performance of existing vendor product or service offerings within the market segment. Each dimension may represent current performance relative to historical performance of the existing product or service offering within the market segment, or current performance relative to current peer performance of the same or substantially similar product or service offerings within additional market segments.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
receiving a first message from a vendor platform of one or more vendor platforms, the first message being associated with a product or service offering in a target market segment of a plurality of market segments within a designated market region, the target market segment including a vendor that is offering a product or service for a telecommunication network;
retrieving, from the one or more vendor platforms, market segment data associated with the target market segment, the market segment data including a quality of service (QoS) index that is associated with the telecommunication network of the target market segment, wherein the QoS index is based at least upon a network latency, packet loss, downlink throughput or uplink throughput of the telecommunication network;
generating a telecommunication network integration index of the product or service offering within the target market segment based at least in part on the QoS index that is associated with the telecommunication network;
comparing the telecommunication network integration index of the product or service offering of the target market segment with a threshold criteria of the telecommunication network;
establishing an association between the product or service offering and the target market segment, based at least in part on a comparison between the telecommunication network integration index of the product or service offering of the target market segment with the threshold criteria of the telecommunication network; and
transmitting a second message, to the vendor platform, indicating the association between the product or service offering and the target market segment, based at least in part on the first message.

2. The computer-implemented method of claim 1, further comprising:
determining a performance of the product or service offering within the target market segment, based at least in part on a generated telecommunication network integration index of the product or service offering; and
wherein, establishing the association between the product or service offering and the target market segment is further based at least in part on the performance of the product or service offering within the target market segment being greater than a predetermined performance threshold.

3. The computer-implemented method of claim 1, further comprising:
determining a similarity between the target market segment and an additional market segment of the market segments based at least in part on operational data associated with vendor hardware or software infrastructure of the target market segment; and
transmitting a further message to the vendor platform identifying the additional market segment, based at least in part on the similarity being greater than a predetermined similarity threshold.

4. The computer-implemented method of claim 1, wherein the telecommunication network integration index reflects a capability of a device to be integrated into the telecommunication network.

5. The computer-implemented method of claim 1, further comprising;
identifying one or more additional market segments within the designated market region that have an existing association with the product or service offering in the target market segment;
determining a similarity between the target market segment and the one or more additional market segments, the similarity being based at least in part on vendor client profile data associated with the product or service offering of the target market segment and the one or more additional market segments; and
generating a performance analysis of the product or service offering within the target market segment based at least in part on a determined vendor client profile data similarity of the product or service offering between the target market segment and the one or more additional market segments.

6. The computer-implemented method of claim 5, further comprising:
generating a multi-dimensional performance (MD-P) score for the product or service offering within the target market segment, the MD-P score having a first dimension and a second dimension, the first dimension indicating relative current performance of the product or service offering within the target market segment to historical performance of the product or service offering within the target market segment, and the second dimension indicating relative current performance of the product or service offering within the target market segment relative to current performance of the product or service offering within other market segments of the market segments, and
wherein, generating the performance analysis is further based at least in part on the MD-P score.

7. The computer-implemented method of claim 1, wherein the QoS index is further based upon jitter, echo, or network responsiveness of hardware or software infrastructure elements of the telecommunication network.

8. The computer-implemented method of claim 1, further comprising:
generating the threshold criteria associated with the product or service offering, the threshold criteria identifying requisite vendor hardware infrastructure or requisite vendor software infrastructure that is associated with the product or service offering.

9. The computer-implemented method of claim 1, further comprising:
    generating a multi-dimensional market segment (MD-MS) score for individual market segments of the market segments, the MD-MS score having a first dimension and a second dimension, the first dimension indicating a level of market saturation associated with the individual market segments, and the second dimension indicating a viability of the-product or service offering within the individual market segments, and
    establishing an association between the product or service offering and the target market segment is based at least in part on the MD-MS score.

10. The computer-implemented method of claim 9, further comprising:
    determining a population index of the product or service offering within the individual market segments relative to a proportion of active vendor clients, and
    wherein the first dimension of the MD-MS score is based at least in part on the population index.

11. The computer-implemented method of claim 1, wherein the product or service offering corresponds to a telecommunications device with Long-Term Evolution (LTE) network capability, and
    wherein, the telecommunication network integration index is based at least in part on the target market segment having LTE network capability.

12. The computer-implemented method of claim 1, wherein, the telecommunication network integration index is based at least in part on integration processing time or a quantitative measure of a technical complexity of integration.

* * * * *